United States Patent [19]

Johnson et al.

[11] 4,427,056
[45] Jan. 24, 1984

[54] AIR ACTUATED VEHICLE TEMPERATURE CONTROL SYSTEM

[75] Inventors: Thomas J. Johnson, Rockford; Garth L. Thomas, Oregon, both of Ill.

[73] Assignee: Kysor Industrial Corporation, Cadillac, Mich.

[21] Appl. No.: 208,661

[22] Filed: Nov. 20, 1980

[51] Int. Cl.³ .................. F28F 27/00; B61D 27/00
[52] U.S. Cl. .................. 165/42; 237/12.3 B; 137/625.48; 251/174
[58] Field of Search ........... 137/625.48, 596, 625.68; 251/174; 165/42, 43

[56] References Cited

U.S. PATENT DOCUMENTS

| | | |
|---|---|---|
| 2,790,605 | 4/1957 | Peterson et al. |
| 3,060,967 | 10/1962 | Hancock et al. ............. 137/596 |
| 3,370,612 | 2/1968 | Holl ................................ 251/174 |
| 3,428,115 | 2/1969 | Caldwell. |
| 3,441,213 | 4/1969 | Maher, Jr. |
| 3,465,962 | 9/1969 | Matulich et al. |
| 3,575,209 | 4/1971 | Kast ......................... 137/625.48 |
| 3,637,962 | 1/1972 | Fiddler et al. ............ 137/625.48 |
| 3,744,523 | 7/1973 | Hill .......................... 137/625.68 |
| 3,828,821 | 8/1974 | Dutter ......................... 251/174 |
| 3,916,988 | 11/1975 | Matsuda. |
| 3,983,930 | 10/1976 | Franz ........................... 165/42 |
| 4,027,699 | 6/1977 | Andersson ............. 137/625.48 |
| 4,147,205 | 4/1979 | Bata et al. |
| 4,167,967 | 9/1979 | Kumagai. |
| 4,174,749 | 11/1979 | Oishi. |

Primary Examiner—William R. Cline
Assistant Examiner—Theophil W. Streule
Attorney, Agent, or Firm—Price, Heneveld, Huizenga & Cooper

[57] ABSTRACT

A vehicle temperature control system includes a control assembly for directing a fluid actuating medium to selected ones of a plurality of door actuators to position a plurality of doors in selected modes of operation. The control assembly includes a valve housing defining a chamber, a fluid inlet passage and a plurality of opposed inlet cavities and outlet passages. A lever positioned slide valve is shiftable within the chamber. An array of control passages defined by the slide valve selectively place the inlet cavities in communication with the outlet passages. Seal members are disposed in each of the inlet cavities and outlet passages to insure that the fluid medium passes through the control passages. A mode selection lever engages the slide valve and also defines a cam surface for selectively actuating an air conditioner compressor switch.

29 Claims, 34 Drawing Figures

AIR ACTUATED VEHICLE TEMPERATURE CONTROL SYSTEM

BACKGROUND OF THE INVENTION

The present invention relates to temperature or environmental control systems for a passenger or operator compartment of a vehicle and more particularly to a unique, manual control assembly for such systems.

Vehicles such as trucks and passenger cars typically include an environmental control or temperature control system for directing and conditioning outside air or recirculating air within the passenger or operator compartment. The systems include duct work having a fresh air inlet, a heat outlet directing air towards the floor of the compartment, a defrost outlet for directing air towards the windshield, and vent and air conditioning outlets. A heater coil or core is supported within the duct work. If so equipped, an air conditioner evaporator coil will also be positioned within the duct work. A plurality of doors are supported in the duct work for selectively directing air in the various modes of operation. Typical systems include a fresh air door, a heat door and a defrost door. Further, a blower is provided to pull air through the evaporator coil, towards the heater coil and through the outlets.

If an evaporator coil is included to cool the air within the passenger or operator compartment, the air conditioning unit will typically have two modes of operation. In a Max A/C Mode of operation, air within the compartment is recirculated through the evaporator coil. In a Normal A/C Mode, outside or fresh air plus a predetermined amount of recirculated air is passed over the evaporator coil and into the passenger compartment. When operating in a Vent Mode, air from the outside is passed directly into the compartment through the vent outlets. In the Heat Mode, outside air plus a predetermined amount of recirculated air is passed over the heater coil and towards the floor of the vehicle compartment. Typically, 70-90% of the heated air will be passed to the floor of the vehicle and the remaining percentage will be directed through the defrost outlets to the windshield. When in the Defrost Mode of operation, the majority of the air will be passed to the defrost outlets and approximately 10-30% of the air will pass to the heat outlets. When operating in a Defog Mode, the air conditioner compressor is operated and air is passed over the evaporator coils and then to the defrost outlets. A portion of the air is directed through the heat outlets and towards the floor of the vehicle compartment.

A blend air door may also be included in the duct work to proportion the amount of air passed through or around the heater coil to thereby control the temperature of the outlet air. Such systems would also include a shut-off water valve which controls flow of engine coolant through the heater coil. The shut-off water valve may be cable or vacuum actuated. Some systems do not include the blend air door but include a proportional water valve actuated through a lever and cable arrangement. The blower motor is typically controlled through a multi-position or speed blower motor switch.

Various control systems have heretofore been proposed for positioning the doors within the duct work. An example of one such system may be found in U.S. Pat. No. 3,916,988, entitled CONTROL MECHANISM FOR AN AIR-CONDITIONED DEVICE IN AUTOMOTIVE VEHICLES and issued on Nov. 4, 1975, to Metsuda. The doors in the system disclosed in this patent are positioned by a control lever integrally formed with a controlling cam mechanism. The doors are connected to the cam mechanism through cables.

Other assemblies have been proposed which automatically control the temperature within the vehicle compartment or enclosure. An example of one such system may be found in U.S. Pat. No. 4,147,205, entitled VACUUM ACTUATED AUTOMATIC TEMPERATURE CONTROL SYSTEM WITH ACTUATOR PRESSURE SIGNAL FEEDBACK and issued on Apr. 3, 1979, to Bata et al.

In still further systems which have been proposed, the doors or dampers within the duct work are positioned by vacuum operated diaphragm actuators. Vacuum from the intake manifold of the engine is selectively directed or diverted to the diaphragm actuators by a control assembly. Electrical controls are also provided for selectively actuating the air conditioning compressor and for controlling the blower motor speed.

A need exists for a relatively simple and easily manufactured control assembly for use in a vehicle environmental or temperature control system and which is capable of positioning the doors through a fluid medium. Such a system would preferably be adaptable for use in trucks or other heavy-duty equipment which have a source of pressurized air.

SUMMARY OF THE INVENTION

In accordance with the present invention, the aforementioned need is satisfied. Essentially, the invention includes a control assembly including a valve for directing a source of fluid selectively to a fresh air door actuator, a heat door actuator and a defrost door actuator in the various modes of operation of a temperature control system. The valve assembly includes a valve element housing defining a valve element chamber or cavity having front and back surfaces. An inlet passage is defined by the housing and which communicates with a plurality of fluid inlet cavities or chambers. The valve element housing further defines a plurality of fluid outlet passages which are aligned with the inlet cavities. A slidable valve element is disposed within the valve element chamber. The valve element may be moved to a plurality of positions to selectively interconnect the inlet cavities and the outlet passages. The valve element defines an array of throughbores positionable to permit the inlet cavities to communicate with the outlet passages through the valve element.

In narrower aspects of the invention, the valve element housing inlet passage is connected to a source of pressurized air and the valve element further defines a plurality of bleed ports connected to bleed passages. The bleed ports permit air to be bled from selected ones of the door actuators so that they will return to their initial or first positions. An actuator lever for moving the valve element is supported on the housing and defines a cam surface which selectively actuates a compressor electrical switch for operation of the system in an Air Conditioning and/or Defog Mode. The control assembly supports a multi-position blower switch for controlling the speed of the blower. Also, a temperature control lever may be supported on the valve element housing and connected to a blend air door or to a water valve through a cable. Seal means are provided in the inlet cavities or chambers and in the outlet passages and which engage the valve element. The seal means insure that fluid under pressure will pass through the ports and/or passages of the element without leaking into the chamber.

The valve housing is easily manufactured in two pieces, namely, a front piece and a back piece. The front piece defines the inlet passage which is connected to the inlet cavities. The back piece defines the outlet passages which are readily connectable to the door actuators. The slide valve element is a planar member which defines an array of throughbores and bleed ports. The throughbores permit fluid to pass from an inlet cavity which is aligned with an outlet passage. The bleed ports are connected to bleed passages which permit air to bleed back from the actuators and out of the valve housing.

DETAILED DESCRIPTION OF THE PREFERRED EMBODIMENT

Figure 1:
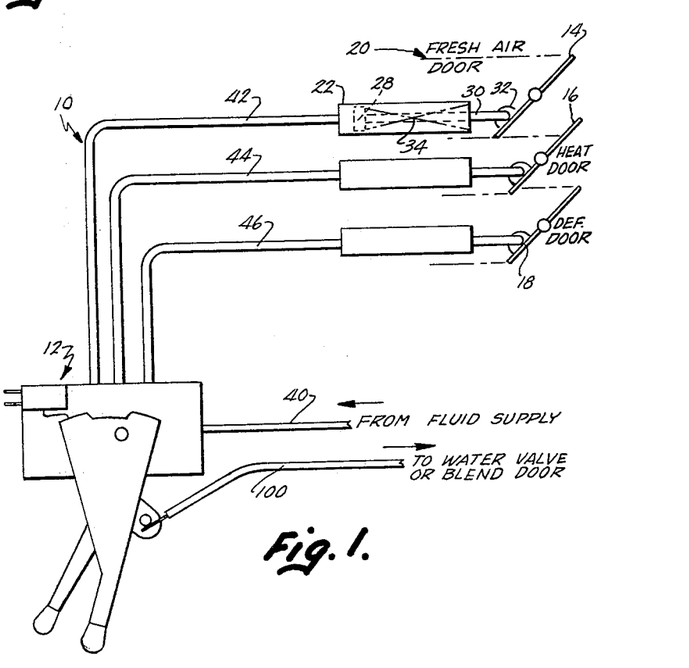
FIG. 1 is a schematic of a vehicle temperature control system including a control assembly in accordance with the present invention.

The preferred embodiment of a temperature control system in accordance with the present invention is schematically illustrated in FIG. 1 and generally designated 10. System 10 includes a manual control assembly generally designated 12, a fresh air door 14, a heat door 16 and a defrost door 18. The doors are pivotally supported within duct work which is schematically shown and generally designated 20. As explained in detail below, the doors 14, 16 and 18 are selectively positionable in the various modes of operation of the temperature control system 10. These doors are movable between first and second positions by actuators 22, 24 and 26, respectively. Each actuator is preferably of the piston cylinder type including a piston 28 and a rod 30 pivotally connected to a bracket 32 on each door. A spring 34 is disposed within each cylinder to bias the piston 28 to the left, when viewed in FIG. 1, so that the doors are normally in the first position shown. Tubing 40 connects the control assembly 12 to a fluid supply. In the preferred embodiment, system 10 is of the type used in a heavy-duty vehicle, such as a semi tractor, and conduit 40 is connected to a source of pressurized air. Each actuator is connected to assembly 12 by tubes 42, 44 and 46, respectively.

Figure 2:
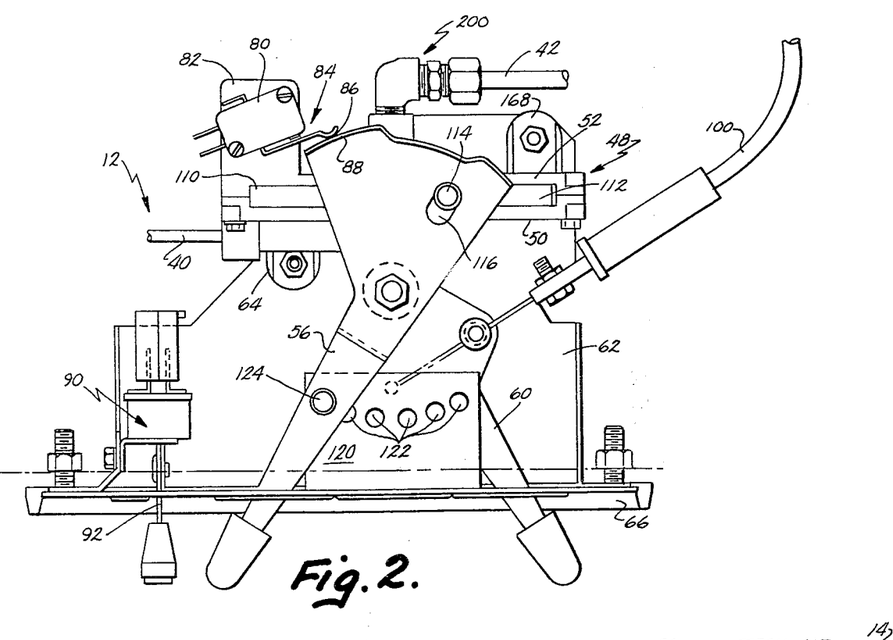
FIG. 2 is a top, plan view of a control assembly in accordance with the present invention.
Figure 3:
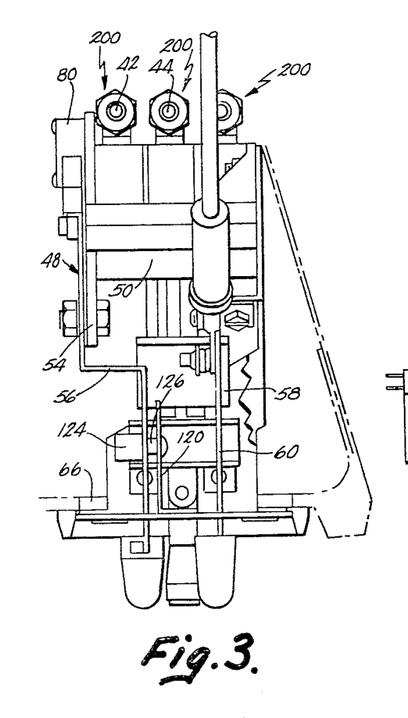
FIG. 3 is a side, elevational view of the control assembly.

As best seen in FIGS. 2 and 3, assembly 12 includes a valve housing generally designated 48. Valve housing 48 includes a valve front member 50 and a valve back member 52. As seen in FIG. 3, valve front member 50 includes a bracket 54 to which a control lever 56 is pivotally supported. Valve front 50 also includes a lower bracket 58 to which a temperature control lever 60 is pivotally supported. Lever 56 is a mode control lever.

Figure 4:
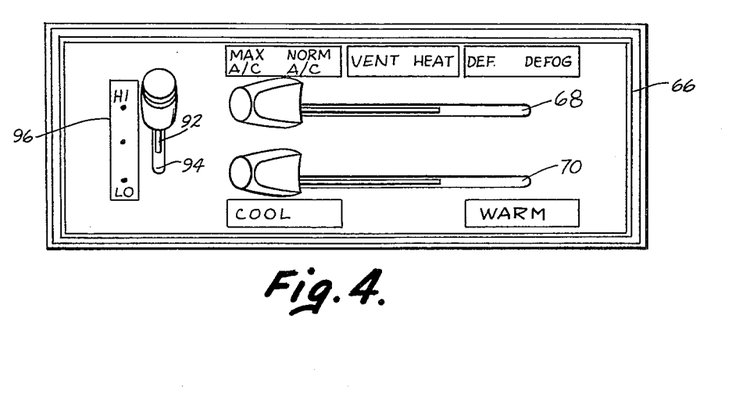
FIG. 4 is a front, elevational view of the assembly.

As seen in FIGS. 2-4, assembly 12 further includes a support plate 62 to which valve housing 48 is secured at a bracket 64. Support plate 62 also carries a control panel or face plate 66. Mode control lever 56 and temperature control lever 60 extend through slots 68, 70, respectively, in control panel 66 (FIG. 4). Control panel 66 includes indicia which designate the various modes of operation of system 10. As shown in FIG. 4, these modes include a Max A/C Mode, a Normal A/C Mode, a Vent Mode, a Heat Mode, a Defrost Mode and a Defog Mode. Panel 66 also indicates movement of temperature control lever 60 from a cool position to a warm position. When lever 56 is positioned below each of the indicia on panel 66, the system is in a particular mode of operation and the doors are selectively positioned within the duct work.

In the embodiment illustrated, a compressor switch 80 is supported on a bracket 82 carried by valve back 52. Compressor switch 80 is electrically connected to a compressor in an air conditioning system (not shown). Switch 80 includes a shiftable contact 84 having a follower surface 86 positioned to engage a cam surface 88 defined by mode control lever 56. As explained in detail below, lever 56 and cam surface 88 selectively actuate switch 80 in the Max A/C, Normal A/C and Defog Modes of operation. Also supported on support plate 62 immediately behind control panel 66 is a multi-position blower speed control switch 90. Switch 90 includes an actuating lever 92 which extends through a slot 94 (FIG. 4) in control panel 66. Panel 66 includes suitable indicia 96 indicating three positions and hence three speeds of operation of a blower motor (not shown) positioned in the duct work of the system.

System 10 is a temperature or environmental control system for a vehicle and which would include a suitable blower connected to switch 90 and which draws outside air into the vehicle or recirculates air within the vehicle. The system would further include a heater core or coil, an evaporator, a vent outlet, a heat outlet and a defrost outlet. Since these portions of the system are conventional, they have not been illustrated. Reference may be had to the aforementioned U.S. patents for a showing of such conventional portions of a temperature control system.

System 10 may employ a blend door to proportion fresh air and conditioned air or a system which employs a proportional water valve to control the temperature of the air in the Heat Mode. In either system, temperature control lever 60 is connected to the water valve or blend door through a suitable cable assembly 100 (FIGS. 1 and 2). As lever 60 is moved from the "cool" to the "warm" position along slot 70, more air would be proportioned to pass through or around the heater coil of the system or increased water from the vehicle's engine coolant system would be passed to the heater coil. Since these arrangements are well-known in the art, they are not described in detail here.

VALVE ASSEMBLY

As seen in FIG. 2, valve front 50 and valve back 52 of valve assembly 48 define an elongated slot 110 opening through upper and lower sides of the valve assembly. Slidably positioned within the slot-like cavity or chamber 110 is a slide valve element 112. Slide valve element 112 includes a vertical post 114 disposed within a slot 116 defined by mode control lever 56. As is clear from FIG. 2, pivotal movement of mode control lever 56 will shift slide valve element 112 within slot-like cavity or chamber 110.

As seen in FIGS. 2 and 3, control panel 66 supports a detent plate 120 having a plurality of apertures 122 formed therein. Apertures 122 correspond to the mode control positions of the valve assembly. A spring loaded detent 124 is carried by lever 56 and includes a plunger 126 biased into apertures 122. As a result, positive, detent positioning of lever 56 and valve element 112 in the modes of operation is achieved.

SLIDE VALVE

Slide valve element 112 is illustrated in detail in FIGS. 5-9. As shown therein, element 112 includes a generally planar, elongated or block-like member 130. Member 130 includes a leading edge 132, a trailing edge 134 and upper and lower transverse edges 136, 138. Member 130 defines a front face or surface 140 and a rear face or surface 142. Member 130 further defines an array of throughbores or control passages 144 and an array of bleed ports 146. Each bleed port opens through rear face 142 and into one of a plurality of bleed passages 148.

Figures 5, 6, 7, 8, 9:
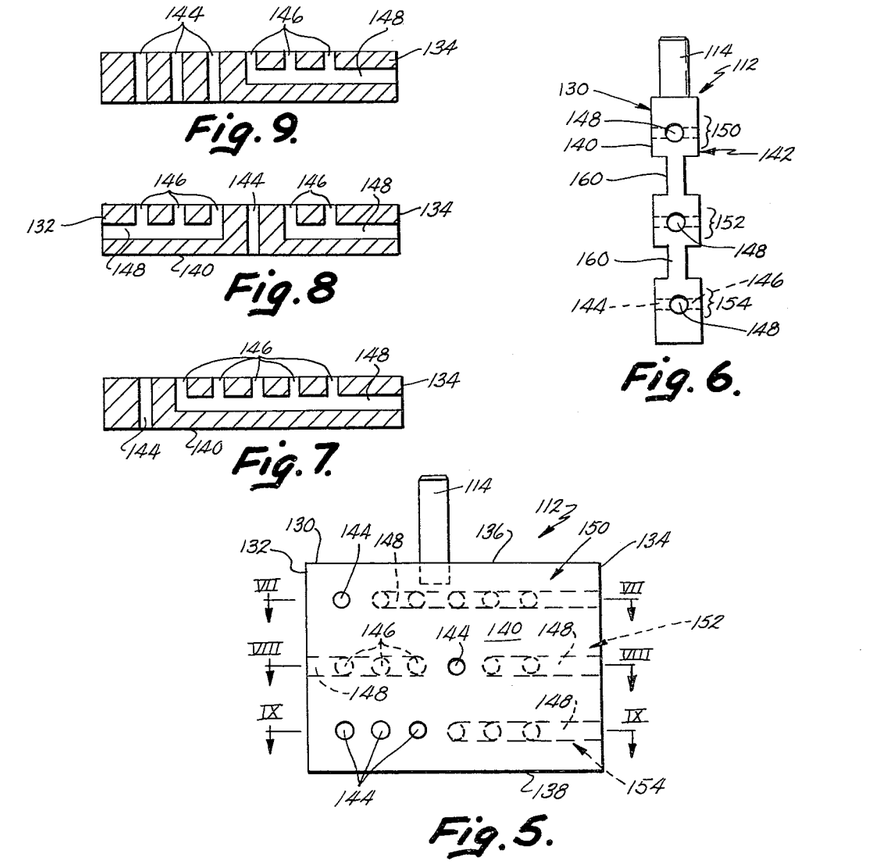
FIG. 5 is a front, elevational view of the valve element incorporated in the present invention.
FIG. 6 is a side or end, elevational view of the valve element.
FIG. 7 is a cross-sectional view taken generally along line VII—VII of FIG. 5.
FIG. 8 is a cross-sectional view taken generally along line VIII—VIII of FIG. 5.
FIG. 9 is a cross-sectional view taken generally along line IX—IX of FIG. 5.

As shown in FIGS. 7-9, member 130 is divided into three horizontal row areas 150, 152 and 154. The preferred embodiment of member 130, as illustrated in FIG. 5, could also be considered to be divided into six vertical row areas equally spaced horizontally from leading edge 132 to trailing edge 134. This will be discussed below in connection with the description of FIGS. 23-34.

Upper horizontal row area 150, as illustrated in FIG. 7, includes a throughbore 144 and five bleed ports 146. Bleed ports 146 all communicate with a single bleed passage 148 which opens through trailing edge 134 of member 130.

Intermediate horizontal row area 152, as seen in FIG. 8, includes from leading edge 132 to trailing edge 134, three bleed ports 146 opening into a bleed passage 148 which in turn opens through leading edge 132, a throughbore 144 and two trailing bleed ports 146 opening into a passage 148 which in turn opens through trailing edge 134.

Lower horizontal row area 154 includes three throughbores 144 and three bleed ports 146. Bleed ports 146 open into a lower bleed passage 148 which in turn opens through trailing edge 134. As seen in FIG. 6, each of the horizontal row areas or portions 150, 152 and 154 are separated by narrow web portions 160.

As seen in FIG. 5, the first vertical row area defined by member 130 includes an upper throughbore, an intermediate bleed port and a lower throughbore. The second vertical row area includes an upper bleed port, an intermediate bleed port and a lower throughbore. The third vertical area includes an upper bleed port, an intermediate bleed port and a lower throughbore. The fourth vertical row area includes an upper bleed port, an intermediate throughbore and a lower bleed port. The fifth and sixth vertical areas, which correspond to the fifth and sixth positions of the valve element, include upper intermediate and lower bleed ports. This is explained further below.

VALVE BACK

Valve back 52 is illustrated in detail in FIGS. 10-14. Valve back 52 is a generally planar, elongated member including an upper longitudinal edge 160, a lower longitudinal edge 162, a leading end 164 and a trailing end 166. Extending rearwardly from valve back 52 is a support bracket 168. As seen in FIG. 2, support bracket 168 is used to secure the valve back to support plate 62. Also, a compressor switch support bracket 82 is formed integral with and extends rearwardly of valve back element 52. Bracket 82 includes elongated slots 170 which permit adjustment and the positioning of compressor switch 80 to insure operation of movable contact 84, as explained below.

Figure 10:
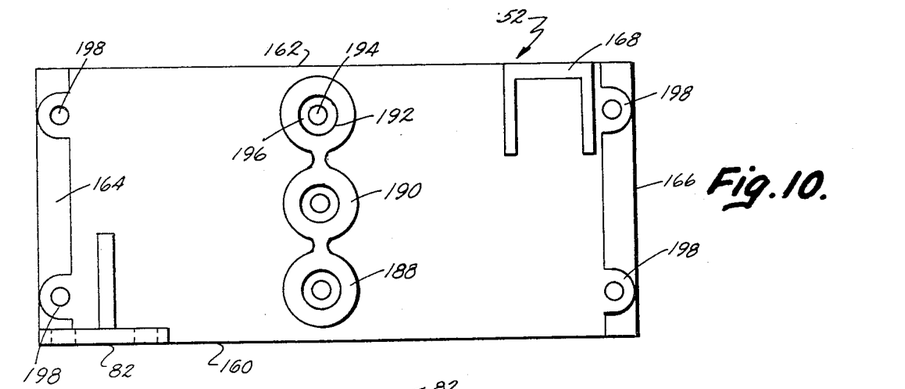
FIG. 10 is a rear, elevational view of a valve back member defining a portion of the valve housing.
Figure 11:
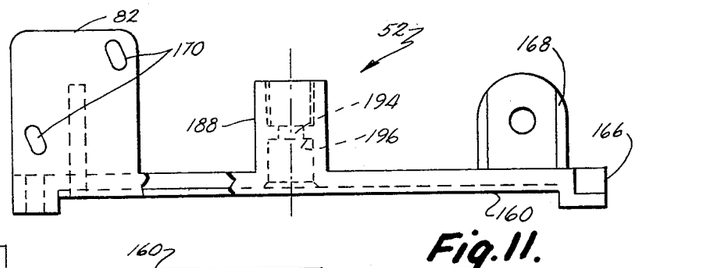
FIG. 11 is a top, plan view of the valve back member.
Figure 12:
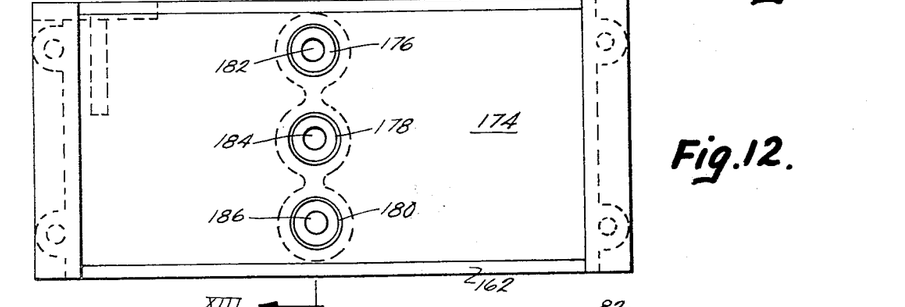
FIG. 12 is a rear, elevational view of the valve back member.
Figure 13:
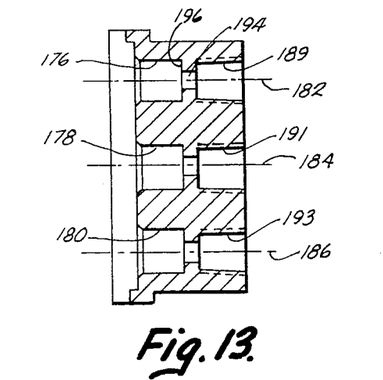
FIG. 13 is a cross-sectional view taken generally along line XIII—XIII of FIG. 12.
Figure 14:
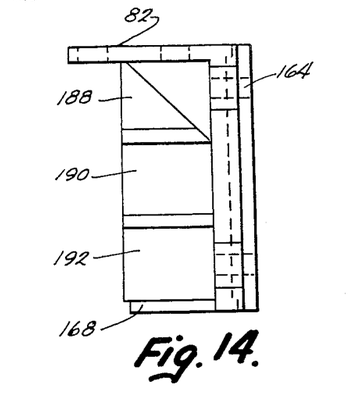
FIG. 14 is a side, elevational view of the valve back member.
Figure 15:
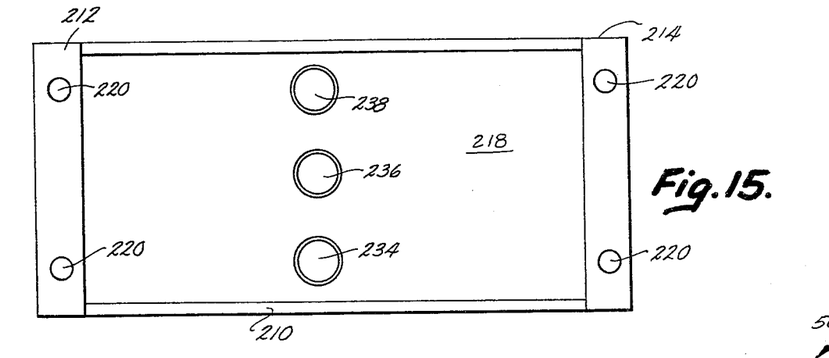
FIG. 15 is a rear, elevational view of a valve front member.
Figure 16:
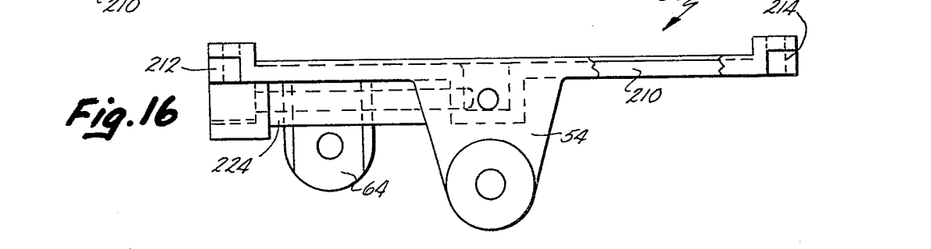
FIG. 16 is a top, plan view of the valve front member.
Figure 17:
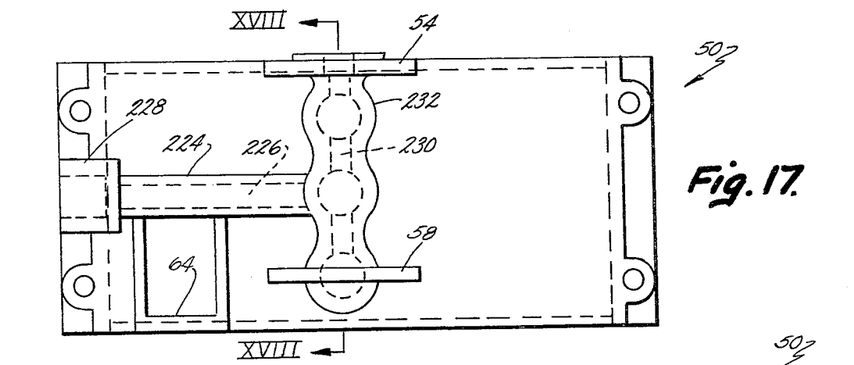
FIG. 17 is a front, elevational view of the valve front member.

Member 52 further defines a back, planar surface 174. Disposed centrally of surface 174 is a vertical row of outlet passages 176, 178 and 180. The centerlines or central axes 182, 184 and 186 of the passages all lie in the same vertical plane. As seen in FIGS. 10 and 11, valve back 52 also defines a plurality of bosses 188, 190 and 192 which extend rearwardly of the valve back element. The bosses define through passages or outlet passages 189, 191 and 193. Passages 189, 191 and 193 are each separated from passages 176, 178 and 180 by restrictions 194. Restrictions 194 are each defined by an annular ring 196.

As seen in FIG. 11, leading end 164 and trailing end 166 of the valve back element extend outwardly perpendicular to surface 174. Ends 164, 166 also define securement tab apertures 198. As seen in FIGS. 1, 2 and 3, boss 192 is connected through tubing 42 to the fresh air door actuator 22. Boss 190 is connected to the heat door actuator 24 through tube 44. Boss 192 is connected to defrost door actuator 26 through tube 46. As seen in FIGS. 2 and 3, tubes 42, 44 and 46 are connected to their respective bosses through suitable elbow joints and fittings 200.

VALVE FRONT

Valve front 50 is illustrated in detail in FIGS. 15–19. As shown therein, valve front 50 is an elongated, generally rectangular member including an upper side 210, a front end 212, a rear end 214 and a lower side 216. Ends 212, 214 extend outwardly from a front surface 218. Ends 212, 214 define mounting apertures 220.

Extending opposite from surface 218 are mode control lever mounting bracket 54, temperature control lever mounting bracket 58 and securement bracket 64.

Figure 18:
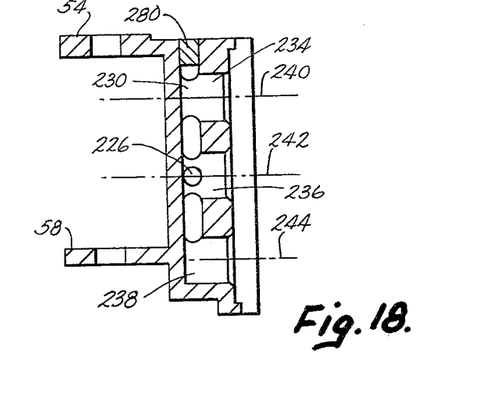
FIG. 18 is a cross-sectional view taken generally along line XVIII—XVIII of FIG. 17.
Figure 19:
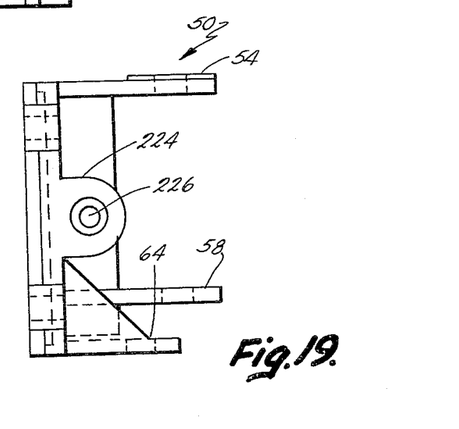
FIG. 19 is a side, elevational view of the valve front member.

Front 50 includes an integral portion 224 defining an inlet passage 226. Passage 226 is connectable to the source of fluid through tube 40 by a suitable connector at an inlet portion 228. Inlet passage 226 extends longitudinally of valve front 50 and communicates with a vertically extending passage 230 which is defined by an integral portion 232. Integral portion 232 also defines a plurality of inlet cavities or chambers 234, 236 and 238. The inlet cavities include central axes 240, 242 and 244, respectively (FIG. 18). Fluid entering inlet passage 226 will be communicated to each of the cavities 234, 236 and 238. The cavities open through surface 218 of valve front 50.

Figure 20:
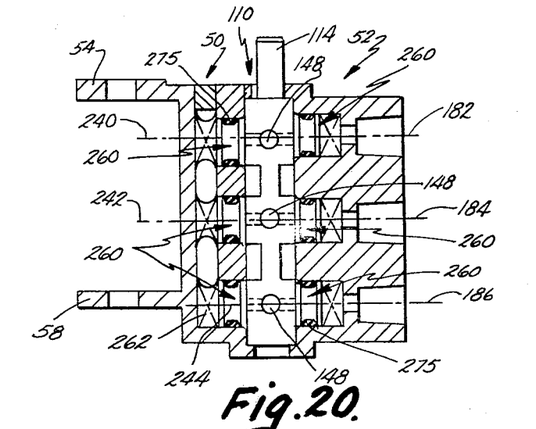
FIG. 20 is an end, elevational view in cross section showing the valve front member, valve back member and valve element in an assembled condition.

As best seen in FIGS. 2 and 20, valve assembly 48 is assembled by placing valve element 112 between faces 174, 218 of the valve back and front, respectively, and then securing the valve back and front together at mounting apertures 198, 220 through suitable fasteners. The valve front and back, therefore, define the elongated slot-like cavity or valve chamber 110 of the valve housing. As is clear from FIG. 20, the inlet cavities and outlet passages are arranged in opposed, paired, coaxial relationship. The horizontal rows 150, 152 and 154 of valve element 112 lie in the same plane as the central axes of the inlet and outlet passages. Therefore, throughbores 144 and bleed ports 146 in each row are coaxial and alignable with the inlet cavities and outlet passages in the various positions of the valve element.

Figure 21:
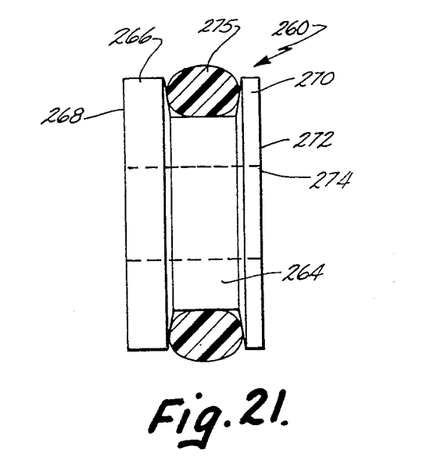
FIG. 21 is a side, elevational view of a seal member incorporated in the present invention.
Figure 22:
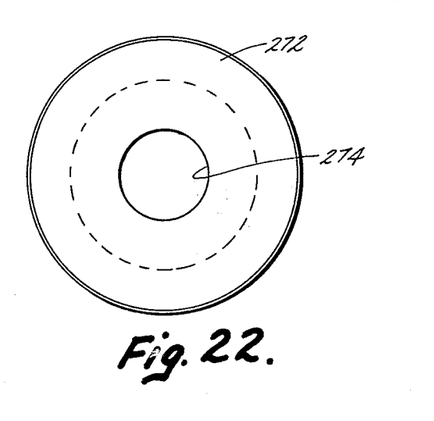
FIG. 22 is a front, elevational view of the seal member.

Provision is made to insure that the air under pressure will pass through the respective throughbores and/or bleed ports defined by the valve element. As seen in FIGS. 20-22, a seal element 260 is disposed in each inlet cavity. A seal element 260 is also disposed in each outlet passage 176, 178 and 180. Each seal element 260 is biased into engagement with a face of slide valve element 110 by a coil spring schematically illustrated in FIG. 20 and designated 262. As seen in FIG. 21, seal element 260 includes a central, cylindrical portion 264, a flange 266 defining a front face 268 and a flange 270 defining a rear face 272. Element 260 further defines a through passage or bore 274. Each element 260 is fabricated from a resilient, non-metallic or plastic material. When in position within either an inlet cavity or outlet passage, face 260 is in sliding and sealing engagement with a front or rear face of valve element 112. An O-ring seal 275 extends around portion 264. Springs 262 bias the seal elements into sealing engagement and contact with valve element 112. Air under pressure entering the inlet cavities through passage 226 and throughbores 144 cannot pass by the faces 268 of the seals and hence into the cavity defined by the front and back members 50, 52. Face 260 seals against the valve element, and O-ring seal 275 seals with the inner peripheral surface of each inlet cavity and outlet passage (FIG. 20). When air is bled from actuators 22, 24, 26, seals 260 and O-rings 275 insure that the air passes into bleed ports 146 defined by the valve element. Seals 260 and springs 262 compensate for wear of the slide valve element 112 and reduce the criticality of manufacturing tolerances. This increases the ease of manufacture and reliability of the valve assembly in use.

As should be readily apparent in view of the above description, the valve element 112, valve back 52 and valve front 50 may be easily and relatively inexpensively manufactured employing conventional casting or molding processes. Machining or finishing steps are minimized, as is wasted material. For example, valve back 52 is readily cast with the support brackets and mounting brackets formed integral therewith. Bosses 188, 190 and 192 may then be drilled and counterbored to define the outlet passage and the annular ring 196. As seen in FIG. 20, springs 262 in the outlet passages abut against such annular wall. In the alternative and as preferred, the passages could be molded in the valve back.

Similarly, the valve front 50 is readily cast and inlet passage 226 drilled and counterbored or molded in portion 224. Passage or vertical passageway 230 is easily drilled or molded in portion 232 from top edge 210. As seen in FIG. 18, after the passage is drilled or molded, the upper edge 210 is sealed by a suitable plug 280. Inlet cavities 234, 236 and 238 may be machined through the surface 218 or formed during the casting process.

Valve element 112 is readily cast and throughbores 144, bleed ports 146 and bleed passages 148 easily drilled or machined or molded into and through the slide valve element. The valve assembly is adapted to divert or control pressurized air, and manufacturing tolerances and leakage problems associated with vacuum actuators and control assemblies are substantially alleviated. Valve element 112 is readily modified by addition or deletion of rows of apertures and bleed ports to adapt the assembly to the desired system. For example, vertical rows may be eliminated if the system is basic and only includes Heat, Vent and Defrost Modes of operation. Wear of the valve element during use as it slides back and forth within slot 110 is readily compensated for by the seal means including the plugs or pad-like elements 260 and springs 262. Solenoids and other electromechanical actuators which have been previously used in temperature control systems are dispensed with. The subject system is completely manually controlled through the mode control lever 56 and the temperature control lever 60.

OPERATION

The operation of assembly 12 in accordance with the present invention is illustrated in FIGS. 23–34. As should readily be apparent to those of ordinary skill in the art, positioning of valve element 112 in any one of the selected positions within slot 110 selectively permits passage of air from the inlet cavities to selected ones of the outlet passages. The air then passes through the tubes 42, 44, 46 to the actuators 22, 24, 26 to position the doors within the duct work for the various modes of operation of the control system. Similarly, the bleed ports and passages selectively positioned in front of the outlet passages of the valve back permit pressurized air to bleed back from the actuators and to be expelled through the open top and/or bottom of slot 110.

MAX A/C MODE

Figure 23:
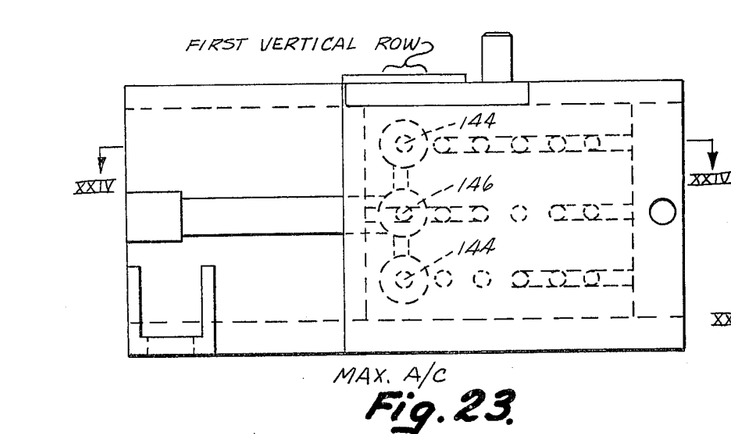
FIG. 23 is a front, elevational view of the valve assembly with the valve element in the Max A/C Mode position.
Figure 24:
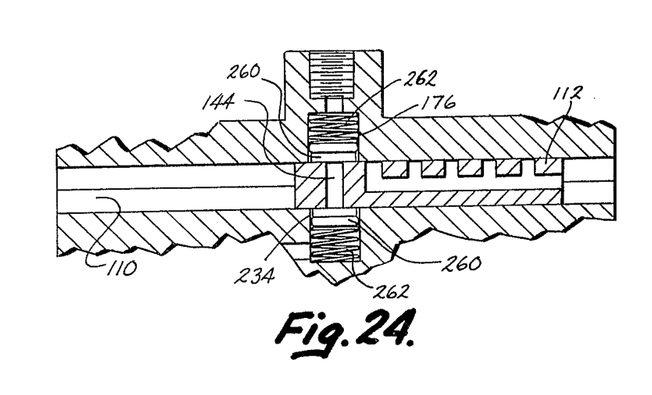
FIG. 24 is a fragmentary, cross-sectional view taken generally along line XXIV—XXIV of FIG. 23.

FIGS. 23 and 24 illustrate the positioning of the valve element when the control lever 56 is in the Max A/C Mode of operation. When in this position, the fresh air door is shifted from its first position, illustrated in FIG. 1, to a second position to close off the fresh air inlet of the system. As a result, air within the vehicle will be recirculated within the vehicle compartment. The defrost door actuator is also shifted from its first to its second position and the heat door actuator is in the position illustrated in FIG. 1. Further, the compressor switch engages an "on" portion of cam 88. As seen in FIG. 23, when in the Max A/C position, valve element 112 is positioned towards the right, and throughbores 144 of the first vertical row are aligned with inlet cavities 234, 238 and outlet passages 176, 180. As a result, pressurized air will pass through the valve element into lines 42, 44 thereby shifting fresh air door 14 and defrost door 18 through actuators 22, 26, respectively. A bleed port 146 of the intermediate horizontal row area and the first vertical row is aligned with outlet passage 178. As a result, air from actuator 24 may pass back through line 44 and out bleed passage 148. As seen in FIG. 2, contact 84 of compressor switch 80 will ride on the raised portion of cam 88 thereby closing switch 80 and actuating the compressor of the air conditioning system.

NORMAL A/C MODE

Figure 25:
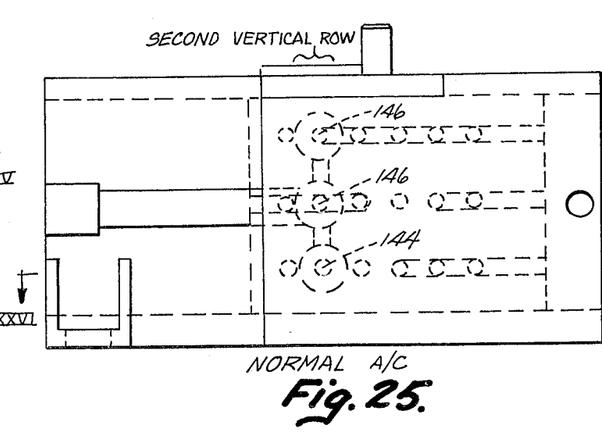
FIG. 25 is a front, elevational view of the valve assembly with the valve element in the Normal A/C Mode position.
Figure 26:
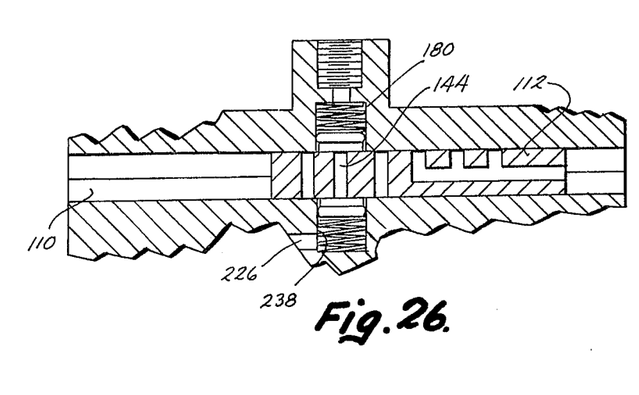
FIG. 26 is a fragmentary, cross-sectional view taken generally along line XXVI—XXVI of FIG. 25.

The Normal A/C Mode is illustrated in FIGS. 25 and 26. When in this mode of operation, fresh air is pulled into the duct work by the blower and allowed to pass through the evaporator coil. As seen in FIG. 25, the second vertical row of valve element 112 is positioned between the inlet cavities and outlet passages. Air is bled from fresh air door actuator 22 and heat door actuator 24. Air passes through a throughbore 144 to the defrost door actuator 26. The fresh air and heat door are in the first positions shown in FIG. 1, and the defrost door is shifted to its second position within the duct work.

VENT MODE

Figure 27:
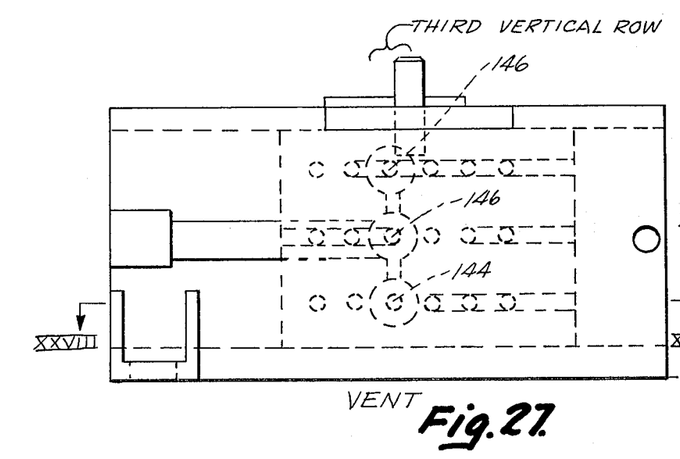
FIG. 27 is a front, elevational view with the valve element in the Vent Mode position.
Figure 28:
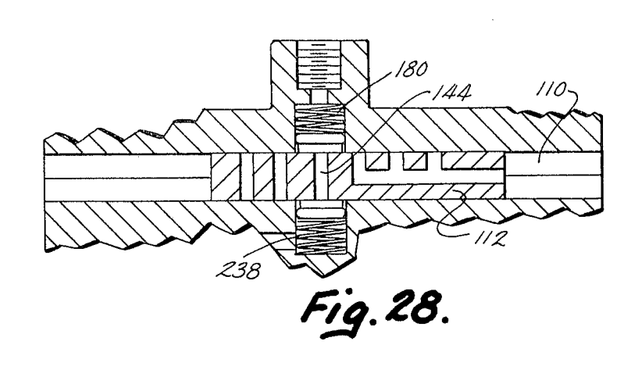
FIG. 28 is a fragmentary, cross-sectional view taken generally along line XXVIII—XXVIII of FIG. 27.

When in the Vent Mode position, the third vertical row of the slide valve 112 is brought into position between the inlet cavities and the outlet passages. When in this position, bleed ports 246 of the upper and intermediate horizontal row areas of the valve element are aligned with the outlet passages 176, 178. Throughbore 144 of the lower horizontal row area of the slide element is brought into alignment with inlet cavity 238 and outlet passage 180. As a result, air is bled off from the fresh air door actuator 22 and the heat door actuator 24. Air, however, passes to the defrost door actuator 26. The compressor switch 80 will enter the reduced or "off" portion of cam 88 and contact 84 will shift away from its fixed contact. As a result, the compressor of the air conditioning system is turned off. Fresh outside air is passed into the vehicle through the vent ducts of the duct work.

HEAT MODE

Figure 29:
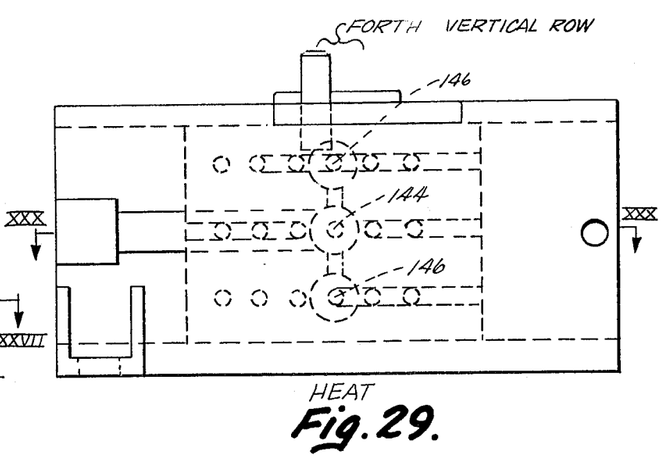
FIG. 29 is a front, elevational view of the valve assembly with the valve element in the Heat Mode position.
Figure 30:
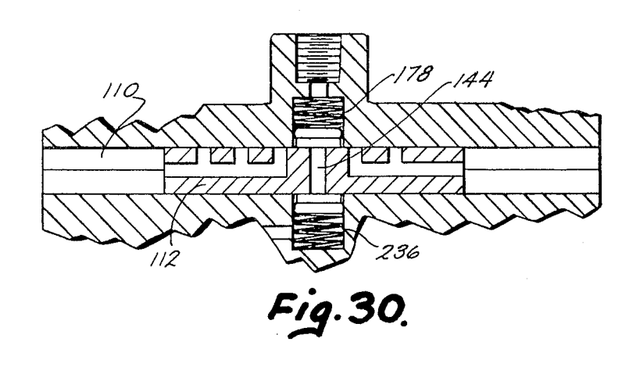
FIG. 30 is a fragmentary, cross-sectional view taken generally along line XXX—XXX of FIG. 29.
Figure 31:
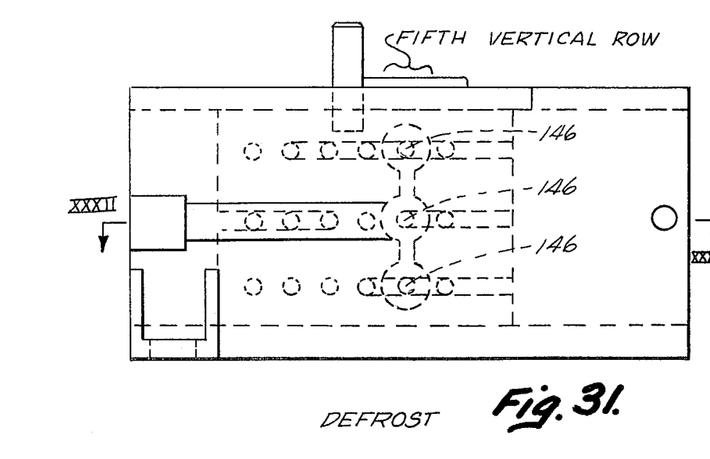
FIG. 31 is a front, elevational view of the valve assembly with the valve element in the Defrost Mode position.
Figure 32:
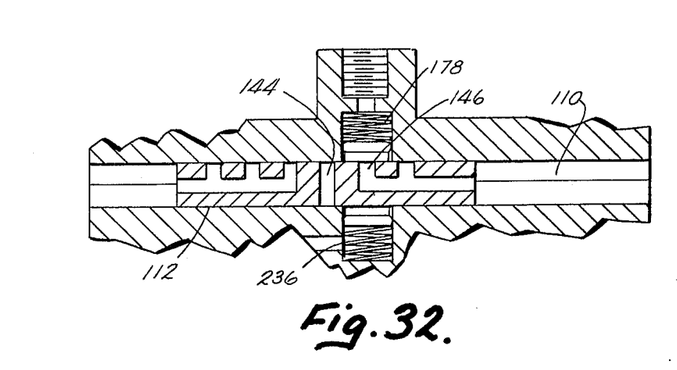
FIG. 32 is a fragmentary, cross-sectional view taken generally along line XXXII—XXXII of FIG. 31.

The Heat Mode of operation is schematically illustrated in FIGS. 29 and 30. When in the heat position, the fourth vertical row of slide valve 112 is placed in the same vertical plane as the inlet cavities and outlet passages. As seen in FIG. 29, a bleed port 146 of the upper horizontal row area of valve element 112 is aligned with outlet passage 176, a bleed port 146 of the lower horizontal row area is aligned with outlet passage 180 and a throughbore 144 of the intermediate row area is aligned with inlet cavity 36 and outlet passage 178. As a result, air is bled off from the fresh air door actuator 22 and the defrost door actuator 46. Air is passed to the heat door actuator 24. Movement of temperature control lever 60 controls the temperature of the air in the Heat Mode.

DEFROST AND DEFOG MODES

The Defrost and Defog Modes of operation are illustrated in FIGS. 31, 32 and 33, 34, respectively. The positioning of doors 14, 16 and 18 are identical in each of these modes of operation. When in the Defrost Mode, the fifth vertical row of the three horizontal row areas of slide valve element 112 is aligned with the inlet cavities and outlet passages. As is clear from FIG. 31, this vertical row includes three bleed ports 146. As a result, air is bled off from the fresh door actuator 22, the heat door actuator 24 and the defrost door actuator 26. The majority of the air drawn into the duct work by the blower is then directed towards the windshield at the defrost outlets of the duct system. When in this position, the compressor switch remains in the "off" portion of cam 88. No air passes from inlet passage 226 to outlet passages of the valve back.

Figure 33:
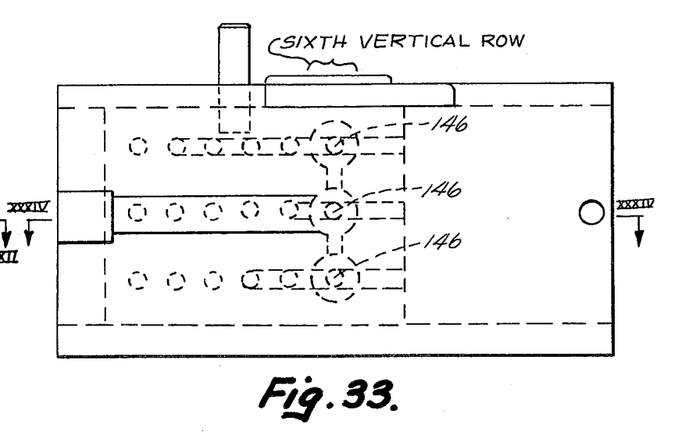
FIG. 33 is a front, elevational view of the valve assembly with the valve element in the Defog Mode position.
Figure 34:
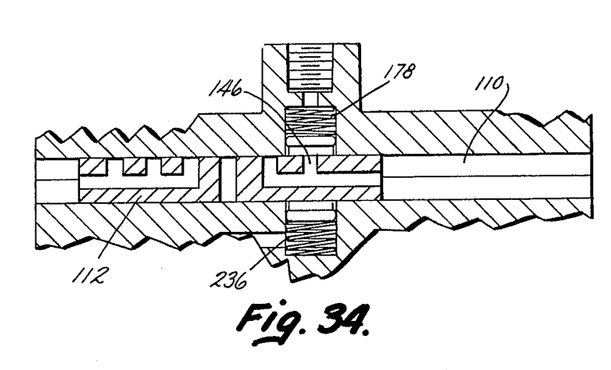
FIG. 34 is a fragmentary, cross-sectional view taken generally along line XXXIV—XXXIV of FIG. 33.

As seen in FIGS. 33 and 34, when the control lever or mode control lever is shifted to its sixth position in the Defog Mode of operation, the sixth vertical row of the three horizontal row areas of slide valve element 112 is moved into alignment with the inlet cavities and outlet passages. The sixth vertical row includes three vertically spaced bleed ports 146. As a result, air is bled off from each of the door actuators 22, 24 and 26. When in this position, however, the mode control lever 56 is positioned so that the right-hand portion of cam surface 88 is in contact with movable switch 84, thereby turning the compressor switch 80 on. In the Defog Mode, conditioned air is directed to the windshield of the vehicle.

When a control assembly in accordance with the present invention is used in a temperature control system which does not include an air conditioner evaporator coil, there would only be Vent, Heat and Defrost Modes of operation. Valve element 112 could, therefore, be formed only with the third, fourth and fifth vertical row arrangements of throughbores and bleed ports on the horizontal row areas of the valve element 112. Only three detent positions need be provided for the control lever 156. The remaining elements of the valve assembly would remain the same. As a result, the subject control assembly is readily adaptable to temperature control systems. An identical valve element as illustrated in the preferred embodiment could be used in a vent, heat and defrost system with the range of travel or movement of the valve limited by suitable stops supported on mounting plate 62 so that only three detent positions are provided.

The control assembly in accordance with the present invention is easily and relatively inexpensively manufactured. The configuration of the valve front and back elements which define the valve housing, the configuration of the slide valve element and the use of the sealing means reduces the criticality of manufacturing tolerances. Reliability in use is achieved.

The control assembly is readily adapted to perform other functions. For example, an additional vertical row of throughbores and bleed ports could be included to position the doors so that air is delivered to air conditioning outlets and the heater outlet in approximately equal quantities to provide a bi-level mode or feature. Such a mode is desired in a blend air system and during which the air conditioning compressor would be actuated to furnish cooling to the air conditioning outlets.

The control assembly readily employs pressurized air available on trucks and other vehicles to control the positioning of the doors in available temperature control systems. Adaption to the various systems is accomplished through substitution of the valve element to provide the desired direction of actuating air. Compensation for valve element wear and/or seal wear is readily achieved with the resilient springs which bias the seal members into engagement with the front and rear faces of the valve element.

In view of the foregoing description, those of ordinary skill in the art will undoubtedly envision various modifications to the subject invention which would not depart from the patentable concepts disclosed herein. It is expressly intended, therefore, that the above description should be considered only as that of the preferred embodiment. The true spirit and scope of the present invention may be determined by reference to the appended claims.

The embodiments of the invention in which an exclusive property or privilege is claimed are defined as follows:

1. For use in a vehicle temperature control system including a plurality of door means for controlling the flow of air through said system in different system modes, a control assembly for selectively interconnecting a plurality of outlet passages with a source of pressurized air to actuate said door means, said assembly comprising:
    a valve front member defining an inlet passage and a plurality of inlet cavities communicating with said inlet passage;
    a valve back member secured to said front member and defining a plurality of outlet passages, said inlet cavities and outlet passages being arranged in opposed, paired relationship with each other, said valve front and back members further defining an open elongated slot-like cavity;
    an elongated, generally planar valve element slidably disposed within said slot-like cavity and movable to a plurality of positions, said valve element defining an array of control passages opening through said element and positioned to permit air to pass from selected ones of said inlet cavities to opposed ones of said outlet passages in the plurality of positions of said valve element, and said valve element defining a plurality of bleed ports movable in front of said outlet passages to bleed air from said outlet passages into said slot-like cavity; and
    a plurality of seals, each disposed in one of said inlet cavities and outlet passages for sealingly engaging said valve element and preventing leakage of air out of said slot-like cavity to insure that air flows through said valve element control passages.

2. A control assembly as defined by claim 1 wherein each of said seal means comprises:
    a pad-like member having a front face, a rear face and a throughbore opening through said faces, said front face engaging said valve element; and
    spring means engaging said pad-like member for biasing said pad-like member front face into engagement with said valve element.

3. A control assembly as defined by claim 1 further including an actuator lever pivotally carried by one of said front and back members; and
    means for interconnecting said actuator lever with said slide valve so that said valve is shifted upon movement of said lever.

4. A fluid actuator control valve for use in a vehicle environment and comfort control system, the system being of the type including duct work interconnecting a fresh air inlet with a vent outlet, a heater outlet and a defrost outlet and further including a movable fresh air door, a movable heat door, and a movable defrost door mounted in said duct work, the doors being shiftable between first and second positions by fluid actuators, said control valve directing actuating fluid selectively to the actuators for said doors and comprising:
    a valve element housing, said housing defining an elongated valve element chamber having a generally planar front surface and a generally planar back surface, an inlet passage adapted to be connected to a source of fluid, and a plurality of outlet passages each adapted to be connected to one of said actuators, said outlet passages being arranged in a row and opening into said chamber through said back surface, said housing further defining a plurality of fluid inlet cavities arranged in a row and each connected to said inlet passage, each of said inlet cavities positioned in opposed relationship to one of said outlet passages and opening into said chamber through said front surface; and
    an elongated valve element slidably disposed within said valve element chamber, said valve element having a generally planar front face movable past said inlet cavities and a generally planar rear face movable past said outlet passages, said valve element defining an array of throughbores arranged in rows and an array of bleed passages, each bleed passage opening through said rear face, said throughbores and said bleed passages being arranged so that as said valve element is moved within said chamber, said inlet cavities and said outlet passages are selectively interconnected to permit fluid to pass from said inlet passage through ones of said outlet passages to selectively actuate said actuators and position said doors.

5. A fluid actuator control valve as defined by claim 4 further including:
    an actuator lever supported on said housing and operatively connected to said valve element for moving said valve element within said chamber.

6. A fluid actuator control valve as defined by claim 4 wherein said housing comprises;
a front member defining said chamber front surface, said inlet passage and said fluid inlet cavities, said fluid inlet cavities being arranged in a generally vertical row and each including a central axis.

7. A fluid actuator control valve as defined by claim 6 wherein said housing further comprises:
a back member defining said chamber rear surface and said outlet passages, each of said outlet passages having a central axis aligned with the central axis of one of said inlet cavities.

8. A fluid actuator control valve as defined by claim 6 further comprising:
a plurality of inlet seal elements, one of said inlet seal elements being disposed in each of said inlet cavities and each of said inlet seal elements defining a bore having an axis co-linear with the central axis of the cavity within which it is disposed, said inlet seal elements each defining a seal face engaging said valve element front face.

9. A fluid actuator control valve as defined by claim 7 further comprising:
a plurality of outlet seal elements, one of said outlet seal elements being disposed in each of said outlet passages and each of said outlet seal elements defining a bore having an axis co-linear with the central axis of the outlet passage within which it is disposed, said outlet seal elements each defining a seal face engaging said valve element rear face.

10. A fluid actuator control valve as defined by claim 9 further comprising:
a plurality of inlet seal elements, one of said inlet seal elements being disposed in each of said inlet cavities and each of said inlet seal elements defining a bore having an axis co-linear with the central axis of the cavity within which it is disposed, said inlet seal elements each defining a seal face engaging said valve element front face.

11. A fluid actuator control valve as defined by claim 10 wherein said valve element comprises:
an elongated, generally planar member having three horizontally extending, vertically spaced rows of throughbores and bleed passages making up said array, each row passing by aligned inlet cavities and outlet passages to direct fluid to and from said actuators.

12. A fluid actuator control valve as defined by claim 10 wherein said valve element comprises:
an elongated, planar member having a leading edge, a trailing edge, an upper edge and a lower edge, said member defining a plurality of row areas equally spaced between said leading edge and said trailing edge and which define said throughbores and said bleed passages.

13. A fluid actuator control valve as defined by claim 12 wherein said valve element row areas include:
a first row having an upper throughbore, an intermediate bleed passage and a lower throughbore whereby when said first row is aligned with said inlet cavities and said outlet passages, fluid will pass through said valve element to the fresh air door actuator, the defrost door actuator and fluid may bleed back from said heat door actuator through said bleed passage.

14. A fluid actuator control valve as defined by claim 13 wherein said valve element row areas further include:
a second row having an upper bleed passage, an intermediate bleed passage and a lower throughbore.

15. A fluid actuator control valve as defined by claim 14 wherein said valve element row areas further include:
a third row having an upper bleed passage, an intermediate throughbore and a lower bleed passage.

16. A fluid actuator control valve as defined by claim 15 wherein said valve element row areas further include:
a fourth row having an upper bleed passage, an intermediate bleed passage and a lower bleed passage so that no fluid passes from said inlet cavities to said outlet passages.

17. A fluid actuator control valve as defined by claim 16 further including:
an actuator lever supported on said housing and operatively connected to said valve element for moving said valve element within said chamber.

18. A fluid actuator control valve as defined by claim 17 wherein said actuator lever includes a cam surface configured to actuate a compressor switch when said actuator lever is in preselected positions.

19. In a vehicle climate control system of the type including an air actuated fresh air door having means for actuating said fresh air door, an air actuated heat door having means for actuating said heat door, an air actuated defrost door having means for actuating said defrost door, an air conditioner evaporator, a heater core and duct work interconnectable with fresh outside air, the evaporator, and the heater core through said doors, said system being operable in a Max A/C Mode, Normal A/C Mode, Vent Mode, Heat Mode, Defrost Mode and a Defog Mode, an air control valve comprising:
a valve body defining inlet means for admitting pressurized air to the body, outlet means connectable to said door actuating means for directing pressurized air from said inlet means to said door actuating means;
a slide valve slidably disposed within said valve element chamber, said slide valve being selectively shiftable to any one of six positions corresponding to Max A/C Mode Normal A/C Mode, Vent Mode, Heat Mode, Defrost Mode and Defog Mode, said slide valve defining passage means for selectively interconnecting said air inlet means with said outlet means in each of said positions to selectively permit air to pass to selected ones of said door actuating means in each of said modes; and
a plurality of passage seal means which are a part of said inlet means and said outlet means and which engage said slide valve for sealing around said slide valve passage means to prevent passage of air into said cavity and to insure that air moves through said passage means, said valve body inlet means comprising three inlet cavities and a main inlet passage communicating with each of said inlet cavities, and wherein said inlet cavities are tandemly arranged in a single row and each cavity defines a central axis.

20. An air control valve as defined by claim 19 wherein said outlet means comprises said valve body defining three outlet passages tandemly arranged in a single row and each defining a central axis, said outlet passages being in opposed coaxially spaced and paired relationship to said inlet cavities.

21. An air control valve as defined by claim 20 wherein said slide valve comprises a body defining said passage means, said passage means including:
- a plurality of bleed passages, each defining a plurality of bleed ports opening towards and communicating with said outlet passages in selected ones of said positions to bleed air from said door actuating means; and
- a plurality of throughbores positioned to permit communication between said inlet cavities and selected ones of said outlet passages in each of said positions so that air will pass through said valve body to said door actuating means.

22. An air control valve as defined by claim 21 wherein said bleed ports and said throughbores are arranged in six rows and positioned to be brought in front of said cavities and said outlet passages in each of said positions, said rows including:
- a first row defining an upper throughbore, an intermediate bleed port and a lower throughbore;
- a second row defining upper and intermediate bleed ports and/or lower throughbore;
- a third row defining upper and intermediate bleed ports and/or lower throughbore;
- a fourth row defining upper and lower bleed ports and an intermediate throughbore;
- a fifth row defining upper, lower and intermediate bleed ports; and
- a sixth row defining upper, lower and intermediate bleed ports.

23. A vehicle environmental control system comprising:
- a fresh air door;
- a fluid operated actuator connected to said fresh air door including means for biasing said fresh air door to a first position;
- a heat door;
- a fluid operated actuator connected to said heat door including means for biasing said heat door to a first position;
- a defrost door;
- a fluid operated actuator connected to said defrost door including means for biasing said defrost door to a first position;
- a source of pressurized fluid;
- control means operatively connected to said source of fluid and said actuators for selectively directing fluid to said actuators to position said doors in a Vent Mode, a Heat Mode and a Defrost Mode of operation, said control means comprising:
- a valve body defining a valve element cavity having opposed front and rear surfaces, three vertically arranged inlet ports connected to said source of pressure and three vertically arranged outlet ports, each connected to one of said actuators, said inlet and outlet ports being aligned with each other to define three paired inlet and outlet ports; and
- a slide valve element movable to at least three positions within said cavity corresponding to a Vent Mode, a Heat Mode and a Defrost Mode, said valve element defining passage means for bleeding fluid from said fresh air door actuator and said heat door actuator and passing fluid to said defrost door actuator when in said Vent Mode, for bleeding fluid from said fresh air door actuator and said defrost door actuator and passing fluid to said heat door actuator when in said Heat Mode, and for bleeding air from each of said actuators when in said Defrost Mode.

24. A vehicle environment control system as defined by claim 23 wherein said valve element passage means comprises:
- a first area including three horizontally spaced bleed ports connected to a bleed passage;
- a second area defining a bleed port connected to another bleed passage, a throughbore interconnecting one of said pairs of inlet and outlet ports when in the Heat Mode and a bleed port connected to another bleed passage; and
- a third area defining two throughbores and another bleed port connected to another bleed passage.

25. A vehicle environment control system as defined by claim 24 wherein said valve element passage means further comprises a fourth area defining another throughbore, another bleed port and another throughbore, respectively, and which are positioned so that fluid passes to said fresh air door and said defrost door actuators and is bled from said heat door actuator when said valve element is positioned in a fourth position corresponding to an A/C Mode.

26. A vehicle environment control system as defined by claim 23 wherein said control means further includes:
- a plurality of seal members, each defining a face and a throughbore, each of said seal members being disposed in one of said inlet ports and outlet ports and having said faces in sealing engagement with said slide valve element; and
- a plurality of spring means disposed in one of said inlet and outlet ports for biasing said seal means into engagement with said slide valve element.

27. A vehicle environment control system as defined by claim 23 wherein said control means further includes:
- a plurality of seal members, each defining a face and a throughbore, each of said seal members being disposed in one of said inlet ports and outlet ports and having its face in sealing engagement with said slide valve element; and
- a plurality of spring means each disposed in one of said inlet and outlet ports for biasing said seal members into engagement with said slide valve element.

28. A vehicle environment control system as defined by claim 24 wherein said control means further includes:
- a plurality of seal members, each defining a face and a throughbore, each of said seal members being disposed in one of said inlet ports and outlet ports and having its face in sealing engagement with said slide valve element; and
- a plurality of spring means each disposed in one of said inlet and outlet ports for biasing said seal members into engagement with said slide valve element.

29. A vehicle environment control system as defined by claim 25 wherein said control means further includes:
- a plurality of seal members, each defining a face and a throughbore, each of said seal members being disposed in one of said inlet ports and outlet ports and having its face in sealing engagement with said slide valve element; and
- a plurality of spring means each disposed in one of said inlet and outlet ports for biasing said seal members into engagement with said slide valve element.

* * * * *